(12) United States Patent
Park

(10) Patent No.: US 10,180,729 B2
(45) Date of Patent: *Jan. 15, 2019

(54) HUMAN MACHINE INTERFACE APPARATUS FOR VEHICLE AND METHODS OF CONTROLLING THE SAME

(71) Applicant: Hyundai Motor Company, Seoul (KR)

(72) Inventor: Hyungsoon Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 570 days.

This patent is subject to a terminal disclaimer.

(21) Appl. No.: 14/563,811

(22) Filed: Dec. 8, 2014

(65) Prior Publication Data

US 2016/0098088 A1    Apr. 7, 2016

(30) Foreign Application Priority Data

Oct. 6, 2014 (KR) .................. 10-2014-0134088

(51) Int. Cl.
*G06F 3/01* (2006.01)
*G06F 3/048* (2013.01)
(Continued)

(52) U.S. Cl.
CPC .............. *G06F 3/017* (2013.01); *B60K 35/00* (2013.01); *B60K 37/06* (2013.01);
(Continued)

(58) Field of Classification Search
None
See application file for complete search history.

(56) References Cited

U.S. PATENT DOCUMENTS 8,625,855 B2 *  1/2014  El Dokor .............. G06F 3/017
                                                              382/106
8,755,568 B2 *  6/2014  Adhikari .............. G06F 3/017
                                                              382/103
(Continued)

FOREIGN PATENT DOCUMENTS

JP    2013-218391 A    10/2013
JP    2014-109994 A     6/2014
(Continued)

OTHER PUBLICATIONS

Korean Notice of Patent Allowance for Korean Patent Application No. 10-2014-0134088, English translation, 9 pages, dated Sep. 7, 2015.

*Primary Examiner* — Yongjia Pan
(74) *Attorney, Agent, or Firm* — Mintz Levin Cohn Ferris Glovsky and Popeo, P.C.; Peter F. Corless

(57) ABSTRACT

A human machine interface (HMI) minimizing the number of gestures for operation control in which user-intended operation commands are accurately recognized by dividing a vehicle interior into a plurality of regions. The HMI receives an input of a gesture according to each region, and controls any one device according to the gesture. Convenience of a user is improved because the gesture may be performed in a state in which region restriction is minimized by identifying an operation state and an operation pattern of an electronic device designated according to each region to recognize the user's intention when the user performs the gesture in a boundary portion between two regions or even in multiple regions.

15 Claims, 14 Drawing Sheets

(51) Int. Cl.
*G06F 3/0484* (2013.01)
*B60K 35/00* (2006.01)
*G06K 9/00* (2006.01)
*B60K 37/06* (2006.01)

(52) U.S. Cl.
CPC ..... *G06K 9/00355* (2013.01); *G06K 9/00832* (2013.01); *B60K 2350/1052* (2013.01)

(56) References Cited

U.S. PATENT DOCUMENTS

| | | | | |
|---|---|---|---|---|
| 8,760,432 B2* | 6/2014 | Jira | ........................ | B60K 37/06 345/174 |
| 8,818,716 B1* | 8/2014 | El Dokor | ............... | G01C 21/00 701/426 |
| 8,942,881 B2* | 1/2015 | Hobbs | .................... | B60K 37/06 701/1 |
| 9,195,391 B2* | 11/2015 | Pisters | .................. | G06F 3/0484 |
| 9,551,590 B2* | 1/2017 | Yan | .................... | B60K 37/06 |
| 2004/0254699 A1* | 12/2004 | Inomae | .................. | B60K 37/02 701/36 |
| 2008/0065291 A1* | 3/2008 | Breed | .................... | B60N 2/002 701/36 |
| 2008/0161997 A1* | 7/2008 | Wengelnik | ............. | B60K 35/00 701/36 |
| 2009/0278915 A1* | 11/2009 | Kramer | .................. | G06F 3/017 348/48 |
| 2010/0238280 A1* | 9/2010 | Ishii | ...................... | B60K 35/00 348/77 |
| 2011/0119640 A1* | 5/2011 | Berkes | .................... | G06F 3/011 715/863 |
| 2013/0009861 A1* | 1/2013 | Valik | .................... | G06F 3/0304 345/156 |
| 2013/0030811 A1* | 1/2013 | Olleon | .................. | B60K 35/00 704/267 |
| 2013/0038437 A1* | 2/2013 | Talati | .................... | B60K 35/00 340/438 |
| 2013/0134730 A1* | 5/2013 | Ricci | ........................ | G06F 9/54 296/24.34 |
| 2013/0155237 A1* | 6/2013 | Paek | ..................... | G06F 1/1632 348/148 |
| 2013/0204457 A1* | 8/2013 | King | ...................... | B60K 28/06 701/1 |
| 2013/0261871 A1* | 10/2013 | Hobbs | .................... | B60K 37/06 701/28 |
| 2013/0271370 A1* | 10/2013 | Wang | ...................... | G06F 3/017 345/158 |
| 2013/0290911 A1* | 10/2013 | Praphul | .................. | G06F 3/017 715/863 |
| 2014/0005857 A1* | 1/2014 | Heisterkamp | ........... | G06F 3/017 701/1 |
| 2014/0013417 A1* | 1/2014 | Sakai | ..................... | G06F 3/005 726/16 |
| 2014/0125598 A1* | 5/2014 | Cheng | .................... | G06F 3/017 345/173 |
| 2014/0277936 A1* | 9/2014 | El Dokor | ................ | G06F 3/017 701/36 |
| 2014/0282273 A1* | 9/2014 | Anderson | ............... | G06F 3/017 715/863 |
| 2014/0361989 A1* | 12/2014 | Entenmann | ............. | G06F 3/017 345/156 |
| 2014/0365228 A1* | 12/2014 | Ng-Thow-Hing | ..... | G02B 27/01 704/275 |
| 2015/0025740 A1* | 1/2015 | Cartarius | ................ | G06F 3/011 701/36 |
| 2015/0185858 A1* | 7/2015 | Nagara | .................. | G06F 3/0304 715/863 |
| 2015/0277848 A1* | 10/2015 | Grothe | .................... | G06F 3/017 340/4.42 |
| 2015/0286952 A1* | 10/2015 | El Dokor | ............... | G06N 99/005 701/1 |

FOREIGN PATENT DOCUMENTS

| | | |
|---|---|---|
| JP | 2014-153954 A | 8/2014 |
| KR | 2011-0117966 A | 10/2011 |
| KR | 2013-0016040 | 2/2013 |
| KR | 10-2014-0130743 A | 11/2014 |

\* cited by examiner

HUMAN MACHINE INTERFACE APPARATUS FOR VEHICLE AND METHODS OF CONTROLLING THE SAME

CROSS-REFERENCE TO RELATED APPLICATION

This application claims the benefit of Korean Patent Application No. 10-2014-0134088, filed on Oct. 6, 2014 in the Korean Intellectual Property Office, the disclosure of which is incorporated herein by reference.

BACKGROUND

1. Field

Embodiments of the present technology relate to a human machine interface (HMI) apparatus for receiving an input of a user's command and controlling at least one device based on the input command, and more particularly, to such an HMI in a vehicle, and methods of controlling the HMI.

2. Description of the Related Art

Vehicles further perform additional functions for convenience of users such as an audio function, a video function, a navigation function, air conditioning control, and lighting control as well as a basic driving functions.

In the vehicles, electronic devices for performing these functions are provided with input units for receiving inputs of operation commands of the electronic devices. The input units of the electronic devices may be integrally arranged in one panel or separately arranged in different panels. It is possible to implement the input units using at least one of a hard key scheme, a touch (screen) scheme, a voice recognition scheme, and a gesture recognition scheme.

Also, a function of outputting an operation command to at least one device as well as a function of receiving an input of an operation command from a user is added to the input unit, so that the input unit may be implemented as an HMI apparatus.

When the input unit of the HMI apparatus is implemented using the hard key scheme, there is a problem in that a wide physical space is required to provide a large number of hard keys. However, the operation load of the user increases with an operation command with a small number of hard keys. Further, there is a problem in that a manufacturing cost of the input unit increases because a light-emitting diode (LED) of a button lamp and a button mechanism for identifying a physical button at night are required.

When the input unit of the HMI apparatus is implemented using a touch screen scheme, it is likely to influence safe driving because a driver has to manually touch a touch screen so as to input an operation command.

When the input unit of the HMI apparatus is implemented using the gesture recognition scheme, there is a problem in that an operation command is erroneously recognized due to an unnatural gesture of a hand's action or the hand's unintended motion. Further, all gestures for operation commands for controlling functions of a plurality of devices have to be learned. In addition, there is a limit in representing operation commands by different gestures.

SUMMARY

Therefore, it is an aspect of the present technology to provide an HMI apparatus for determining an operation command based on a recognized gesture and a region in which the gesture is performed, wherein a user-intended region is determined by identifying operation information of electronic devices designated in a plurality of regions when the gesture is performed simultaneously in the plurality of regions, and an operation command is determined based on the determined region and the recognized gesture, and outputting the operation command to any one electronic device. Preferably, this HMI is in a vehicle. The subject technology also includes methods of controlling this HMI.

Therefore, it is another aspect of the present technology to provide an HMI apparatus for outputting nonconformity guide information when it is determined that an operation command of an electronic device based on a recognized gesture and a region in which a gesture is performed is an unsuitable command for operation control of the electronic device and outputting guide information to a user by determining a possibility of an operation command of an adjacent region.

Additional aspects of the technology will be set forth in part in the description which follows and, in part, will be obvious from the description, or may be learned by practice of the subject technology.

In accordance with one aspect of the present technology, there is provided a vehicle having an HMI apparatus configured to output an operation command of a user to at least one of a plurality of electronic devices. In particular, the HMI apparatus includes: a storage unit configured to store position information of a plurality of regions, operation commands of the plurality of electronic devices positioned in the plurality of regions, and gesture information of the operation commands; a recognition unit configured to recognize a gesture of the user; and a control unit configured to identify electronic devices installed in a region adjacent to a boundary region when the gesture is recognized in the boundary region of the plurality of regions and control the operation command corresponding to the gesture to be output to any one of the identified electronic devices.

The control unit may identify operation information of electronic devices having the gesture according to each adjacent region, determine adjustment possibilities that operations of the identified electronic devices will be adjusted based on the operation information of the identified electronic devices, and output the operation command corresponding to the gesture to an electronic device having a highest adjustment possibility.

The control unit may identify priorities of the electronic devices having the gesture according to each adjacent region and output the operation command corresponding to the gesture to an electronic device having highest priority.

The plurality of electronic devices may include at least two devices of an air conditioning device, an audio device, a navigation device, a lighting device, a Bluetooth device, a heater within a seat, a window glass opening/closing device, a sunroof opening/closing device, a door opening/closing device, and a door lock device, and the operation command may include a power ON/OFF command and a function adjustment command.

The storage unit may further store operation patterns of the plurality of electronic devices, and the control unit may determine adjustment possibilities that operations of the identified electronic devices will be adjusted using operation information and pre-stored operation patterns of the identified electronic devices.

The control unit may compare the operation patterns of the electronic devices corresponding to the gesture according to each adjacent region to current operation information and determine an electronic device having a larger difference in the comparison as an electronic device having a high adjustment possibility.

When the gesture is recognized in one region, the control unit may identify an electronic device having the gesture among electronic devices installed in the one region and control the operation command corresponding to the gesture to be output to the identified electronic device.

The vehicle may further include a detection unit configured to detect an object for the gesture.

In accordance with another aspect of the present technology, a vehicle having a plurality of electronic devices includes a plurality of detection units arranged in a plurality of regions; and an HMI apparatus configured to output an operation command of a user to the plurality of electronic devices arranged in the plurality of regions, wherein the HMI apparatus includes: a storage unit configured to store position information of the plurality of regions, operation commands of the plurality of electronic devices arranged in the plurality of regions, and gesture information of the operation commands; a recognition unit configured to recognize a gesture of the user; and a control unit configured to identify a region in which a detection unit recognizing the gesture is arranged when the gesture is identically recognized in the plurality of detection units, identify electronic devices installed in the identified region, and control the operation command corresponding to the gesture to be output to any one of the identified electronic devices.

The control unit may identify operation information of electronic devices having the gesture according to each identified region, determine adjustment possibilities that operations of the identified electronic devices will be adjusted based on the operation information of the identified electronic devices, and output the operation command corresponding to the gesture to an electronic device having a highest adjustment possibility.

In accordance with still another aspect of the present technology, a control method of a vehicle having a plurality of electronic devices and an HMI apparatus configured to output an operation command of a user to at least one of the plurality of electronic devices includes: detecting an object; recognizing a detection region and a gesture of the detected object; identifying electronic devices installed in a region adjacent to a boundary region when the gesture is recognized in the boundary region of a plurality of regions; and outputting the operation command corresponding to the gesture to any one of the identified electronic devices.

The outputting of the operation command corresponding to the gesture to any one of the identified electronic devices may include: identifying operation information of electronic devices having the gesture according to each adjacent region; determining adjustment possibilities that operations of the identified electronic devices will be adjusted based on the operation information of the identified electronic devices; and outputting the operation command corresponding to the gesture to an electronic device having a highest adjustment possibility.

The outputting of the operation command corresponding to the gesture to any one of the identified electronic devices may include: identifying priorities of the electronic devices having the gesture according to each adjacent region; and outputting the operation command corresponding to the gesture to an electronic device having highest priority.

The outputting of the operation command corresponding to the gesture to any one of the identified electronic devices may include: identifying operation information of electronic devices corresponding to the gesture according to each adjacent region; receiving traveling information and environmental information of the vehicle; determining adjustment possibilities of the identified electronic devices based on the operation information of the identified electronic devices, the traveling information, and the environmental information; and outputting the operation command corresponding to the gesture to an electronic device having a highest adjustment possibility.

The outputting of the operation command corresponding to the gesture to any one of the identified electronic devices may include: identifying operation information and operation patterns of the identified electronic devices according to each adjacent region; determining possibilities that operations of the identified electronic devices will be adjusted based on the operation information and the operation patterns of the identified electronic devices; and outputting the operation command corresponding to the gesture to an electronic device having a highest adjustment possibility.

The plurality of electronic devices may include at least two devices of an air conditioning device, an audio device, a navigation device, a lighting device, a Bluetooth device, a heater within a seat, a window glass opening/closing device, a sunroof opening/closing device, a door opening/closing device, and a door lock device, and the operation command may include a power ON/OFF command and a function adjustment command.

The control method of the vehicle may further include: identifying, when the gesture is recognized in one region, an electronic device corresponding to the gesture among electronic devices installed in the one region; and outputting the operation command corresponding to the gesture to the identified electronic device.

In accordance with still another aspect of the present technology, an HMI apparatus includes a storage unit configured to store position information of a plurality of regions, information of a plurality of electronic devices arranged in the plurality of regions, and gesture information of a user corresponding to operation commands of the plurality of electronic devices; a recognition unit configured to recognize a gesture of the user; a control unit configured to identify electronic devices corresponding to a gesture according to each recognized detection region when the number of recognized detection regions is at least two, determine adjustment possibilities of the electronic devices based on current operation information of the identified electronic devices, and output an operation command corresponding to the gesture to an electronic device having a highest adjustment possibility; and an output unit connected to each of the plurality of electronic devices and configured to output the operation command to at least one electronic device.

The storage unit may further store previous operation patterns of the plurality of electronic devices, and the control unit may use the operation patterns of the electronic devices when the adjustment possibilities of the electronic devices are determined.

When the number of recognized detection regions is one, the control unit may identify an electronic device having the recognized gesture among electronic devices installed in the detection region and output the operation command corresponding to the gesture to the identified electronic device.

The HMI apparatus may further include a detection unit configured to detect an object for recognizing the gesture of the user, wherein the recognition unit receives a detection signal from the detection unit configured to detect the object for recognizing the gesture of the user.

According to the present technology, it is possible to minimize the number of gestures for operation control and accurately recognize a user-intended operation command by dividing one space into a plurality of regions, receiving a gesture according to each region, and controlling any one device according to the received gesture.

In addition, according to the present technology, it is possible to improve the convenience of a user because a gesture may be performed in a state in which region restriction is minimized by identifying an operation state and an operation pattern of an electronic device designated according to each region to recognize the user's intention when the user performs the gesture in a boundary portion between two regions.

According to the present technology, a user may easily operate various types of electronic devices, even during driving, and it is possible to improve the convenience of the user and the safety of a vehicle.

Thus, it is possible to improve desirability by improving quality of an HMI apparatus and a vehicle using such an HMI apparatus.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

These and/or other aspects of the subject technology will become apparent and more readily appreciated from the following description of the embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although an exemplary embodiment is described as using a plurality of units to perform the exemplary process, it is understood that the exemplary processes may also be performed by one or plurality of modules or units that are combined and arranged into fewer or more parts that provide the same functional advantages. Additionally, it is understood that the term controller/control unit refers to a hardware device that includes a memory, a processor and necessary peripheral hardware for operation of the same. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present technology will be described in detail with reference to the accompanying drawings.

Figure 1:
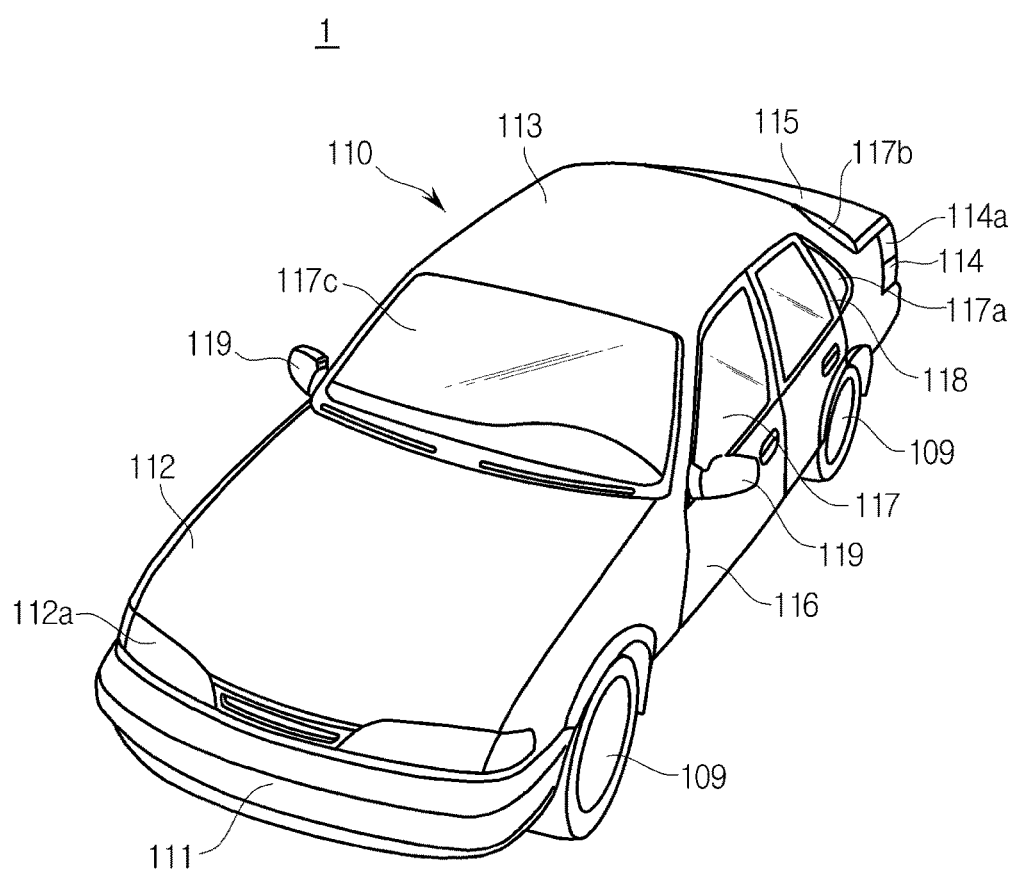
FIG. 1 is an exemplary diagram of a vehicle having an HMI apparatus according to an embodiment.
Figure 2:
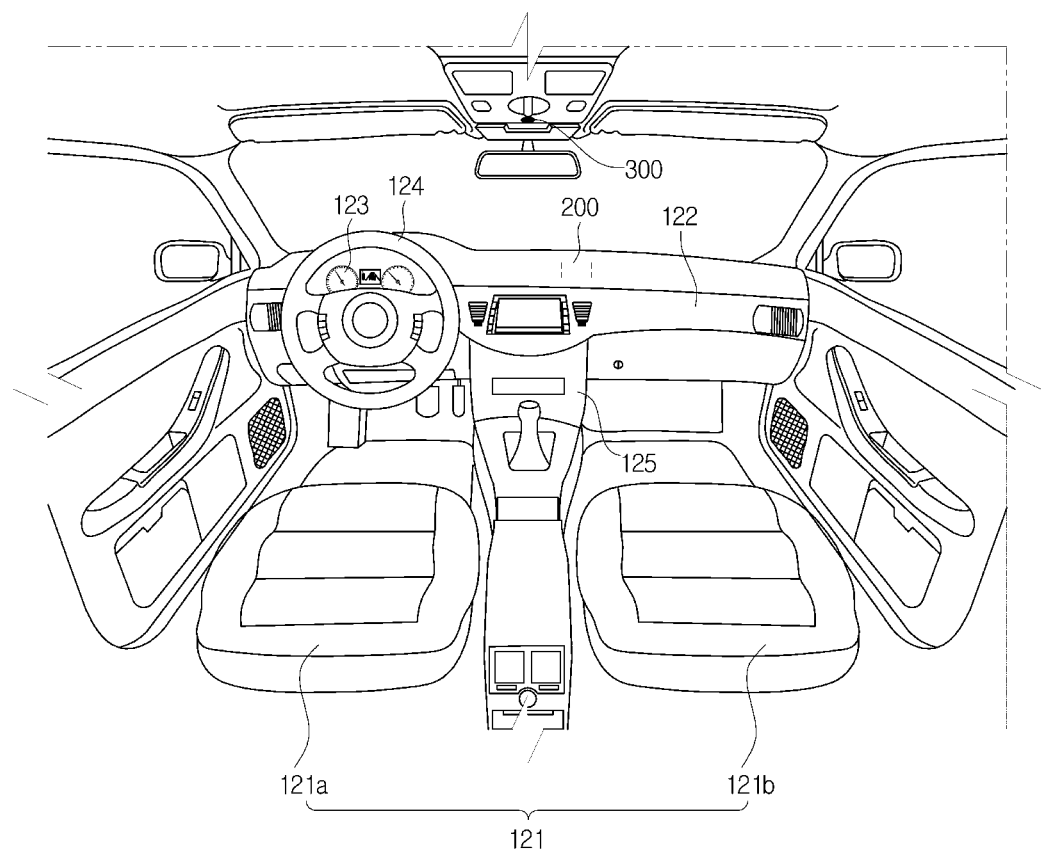
FIG. 2 is an exemplary diagram of an interior of the vehicle having the HMI apparatus according to the embodiment.

Referring to FIGS. 1 and 2, FIG. 1 is an exemplary diagram of a vehicle having an HMI apparatus according to an embodiment, and FIG. 2 is an exemplary diagram of an interior of the vehicle having the HMI apparatus according to the embodiment.

Among other things, a vehicle 1 is a device which drives wheels 109 and moves on roads as the purpose of transporting humans or goods. The vehicle 1 includes a body having an interior and an exterior and a chassis on which mechanical devices necessary for driving are installed as the remaining parts except for the body.

As illustrated in FIG. 1, the exterior 110 of the body includes a front panel or bumper 111, a hood 112, a roof panel 113, a rear panel 114, a trunk 115, front, rear, left, and right doors 116, window glass 117 provided in the front, rear, left, and right doors 116, and the like.

In addition, the exterior of the body further includes pillars 118 provided in boundaries between the front panel 111, the hood 112, the roof panel 113, the rear panel 114, the trunk 115, the window glass 117, and the front, rear, left, and right doors 116.

In addition, the exterior of the body further includes quarter window glass 117a installed adjacent the pillars 118 so that opening/closing is disabled, rear window glass 117b installed on a rear side, and front window glass 117c installed on a front side.

The exterior of the body further includes side mirrors 119 for providing a driver with a field of view in a rear direction of the vehicle 1 and the like.

The chassis (not shown) of the vehicle 1 includes a power generating device, a power transfer device, a driving device, a steering device, a braking device, a suspension device, a speed change device, a fuel device, front, rear, left, and right wheels, and the like.

The vehicle 1 further includes various safety devices for safety of a driver and a passenger.

As the safety devices of the vehicle 1, there are various types of safety devices such as an airbag control device for the safety of the driver and the passenger at the time of a vehicle collision and an electronic stability control (ESC) device for stabilizing a posture of the vehicle 1 at the time of acceleration or cornering of the vehicle 1.

In addition, the vehicle 1 may further include sensing devices such as a proximity sensor for sensing an obstacle or another vehicle in a rear or lateral direction, a rain sensor for sensing precipitation and an amount of precipitation, a temperature sensor for sensing indoor and outdoor temperatures, and the like.

The vehicle 1 includes an electronic control unit (ECU) for controlling the actuation of the power generating device, the power transfer device, the driving device, the steering device, the braking device, the suspension device, the speed change device, the fuel device, the safety devices, various sensors and the like.

Also, the vehicle 1 may selectively include electronic devices such as an air conditioning device, a lighting device, a navigation device, a seat's heater (that is, a hot wire assembly), a hands-free device, a global positioning system (GPS) device, an audio device, a Bluetooth device, a rear camera, a charging device for an external terminal, and a high-pass device installed for convenience of the driver.

Also, the vehicle 1 may selectively include electronic devices such as a sunroof opening/closing device for automatically opening/closing a sunroof, a door opening/closing device for automatically opening/closing front, rear, left, and right doors, a window glass opening/closing device for automatically opening/closing window glasses, and a door lock device for automatically locking and unlocking the front, rear, left, and right doors.

This vehicle 1 may further include a starter button for inputting an operation command to a starter motor (not illustrated).

That is, when the starter button is turned on, the vehicle 1 operates the starter motor (not illustrated) and drives an engine (not illustrated) which is the power generating device through an operation of the starter motor.

The vehicle 1 further includes a battery (not illustrated) electrically connected to the navigation device, the audio device, the indoor lighting device, the starter motor, and the other electronic devices and configured to supply actuating power. Preferably, the battery is charged using a self-generator or the engine's power during driving.

As illustrated in FIG. 2, the interior 120 of the body includes seats 121 (121a and 121b) in which passengers sit, a dash board 122, an instrument board (that is, a cluster 123) arranged on the dash board 122. The cluster 123 includes a tachometer, a speedometer, a coolant thermometer, a fuel gauge, a direction indicator lamp, a high beam indicator lamp, a warning lamp, a seat belt warning lamp, a distance recorder, an odometer, an automatic speed change selection lever indicator lamp, a door open warning lamp, an engine oil warning lamp, and a fuel shortage warning lamp and the like. The vehicle 1 also includes a steering wheel 124 for operating a vehicle direction, and a center fascia 125 on which a control panel for the audio device, the air conditioning device and so on are arranged.

The seats 121 include a driver's seat 121a in which a driver sits, a passenger seat 121b in which a fellow passenger sits, and a rear seat positioned in the rear direction within the vehicle 1.

The cluster 123 may be implemented in a digital scheme. The cluster of the digital scheme displays an image of vehicle information and traveling information.

The center fascia 125 is positioned between the driver's seat 121a and the passenger seat 121b in the dash board 122, and has a control panel provided with a plurality of buttons for adjusting the audio device, the air conditioning device, and the seat's heater. An air outlet, a cigar jack, and the like may be installed in the center fascia 125.

In addition, a terminal device (for example, the navigation device) for receiving an input of information from a user and outputting a result corresponding to the input information may be provided in the center fascia 125.

In the vehicle, an HMI apparatus 200 for controlling operations of various types of electronic devices based on operation commands input by the user may be provided. That is, the HMI apparatus 200 receives inputs of operation commands of various types of electronic devices and transmits the input operation commands to relevant electronic devices. The HMI apparatus 200 recognizes a gesture of the user, identifies an operation command corresponding to the recognized gesture, and outputs the identified operation command to the electronic device. The HMI apparatus 200 is be described in more detail below.

Also, in the vehicle, a detection unit 300 for providing gesture information of the user to the HMI apparatus 200 may be further provided. Here, the detection unit 300 detects an object (for example, the user's hand) and transmits a detection signal for a shape and motion of the detected object to the HMI apparatus 200. The detection unit 300 may include a camera for collecting an image of the object. In addition, the detection unit 300 may include two cameras for collecting images at different positions. That is, the HMI apparatus 200 acquires a three-dimensional (3D) image using images collected by the two cameras and recognizes the shape and motion of the object from the acquired 3D image. In addition, the detection unit 300 may include a 3D camera. The detection unit 300 may also include a capacitive sensor for detecting capacitance of the object, an ultrasonic sensor for detecting a distance from the object, or an optical sensor for detecting light reflected from the object. The detection unit 300 may even be integrally provided in the HMI apparatus 200.

Figure 3:
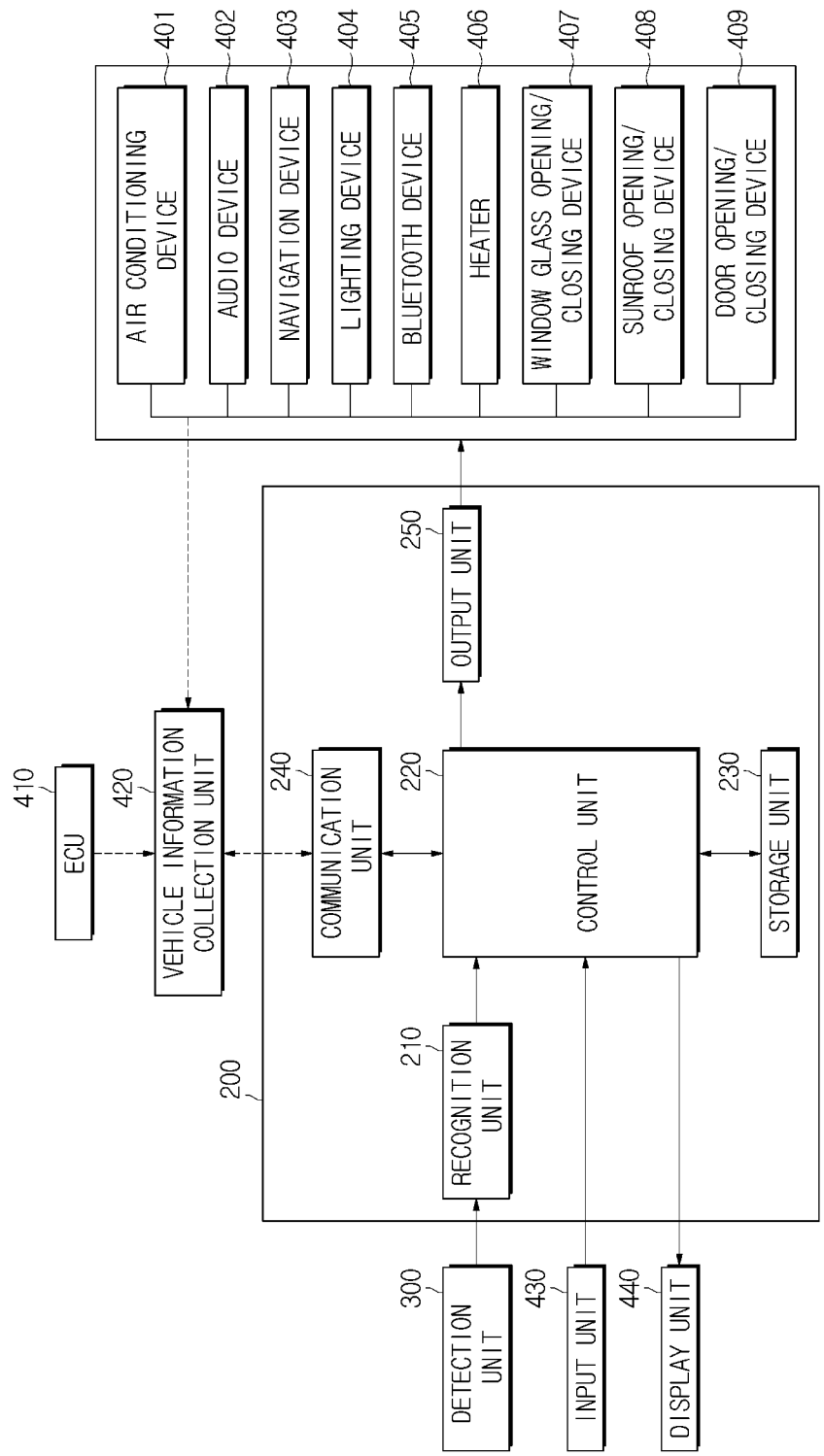
FIG. 3 is a control configuration diagram of the HMI apparatus according to the embodiment.

Referring now to FIG. 3, a control configuration diagram of the HMI apparatus according to the embodiment illustrates a control configuration of the HMI apparatus provided in the vehicle 1.

As illustrated in FIG. 3, the HMI apparatus 200 includes a recognition unit 210, a control unit 220, a storage unit 230, a communication unit 240, and an output unit 250.

The recognition unit 210 acquires a shape and motion of an object based on a detection signal detected by the detection unit 300 and recognizes a gesture corresponding to the acquired shape and motion. In addition, the recognition unit 210 identifies a position at which the object is detected and recognizes a region in which the gesture is performed based on the identified position. That is, the recognition unit 210 recognizes a detection region of the object.

The recognition unit 210 processes collected images when the detection unit 300 is a camera, acquires the shape and motion of the object based on the processed images, and identifies the position of the detected object. The recognition unit 210 may be included in the control unit 220 or elsewhere.

When a gesture is recognized in a boundary region between regions, the control unit 220 determines adjustment possibilities of operations of electronic devices based on operation information of the electronic devices installed in a region adjacent to the boundary region, and controls an operation command corresponding to the gesture to be output to an electronic device having a highest adjustment possibility according to a determination result.

A control configuration of the control unit 220 will be more specifically described. The control unit 220 determines whether the number of recognized detection regions is one, identifies an operation command corresponding to the recognized gesture when the number of recognized detection regions is one, identifies an electronic device having the identified operation command, and controls the output unit 250 to output the operation command to the identified electronic device. That is, the control unit 220 enables the electronic device to be controlled according to the user's intention by identifying the operation command of the electronic device corresponding to the recognized detection region and the recognized gesture, and outputting the operation command to the identified electronic device.

The control unit 220 determines whether the operation command of the electronic device corresponding to each recognized detection region is present when the number of recognized detection regions is at least two and controls the operation command to be output to the electronic device corresponding to the gesture when it is determined that the operation command of the electronic device is present only in any one region. Preferably, determining whether the number of recognized detection regions is at least two includes determining whether the recognized detection region is a boundary region between the regions. The boundary region is a region in which the two regions are adjacent and includes a region within a given range at a position at which the two regions are adjacent.

The control unit 220 identifies an electronic device corresponding to the gesture according to each recognized detection region when the number of recognized detection regions is at least two, determines adjustment possibilities of the electronic devices based on current operation information of the identified electronic devices, and controls the operation command corresponding to the gesture to be output to an electronic device having a highest adjustment possibility.

The operation information of the electronic device includes opening/closing information, ON/OFF information, selection value (for example, volume level, indoor temperature, and radio channel) information of functions, and the like.

For example, the control unit 220 identifies a first electronic device having an operation command corresponding to a recognized gesture in a first region when an object is recognized in first and second regions, identifies a second electronic device having an operation command corresponding to the gesture recognized in the second region, determines an adjustment possibility of the first electronic device and an adjustment possibility of the second electronic device by identifying current operation information of the identified first and second electronic devices, identifies the electronic device having a higher adjustment possibility between the two adjustment possibilities, and controls the operation command corresponding to the gesture to be output to the identified electronic device.

In addition, the control unit 220 may identify electronic devices corresponding to the gesture according to each recognized detection region when the number of recognized detection regions is at least two. The control unit 220 can determine adjustment possibilities of the electronic devices based on current operation information and previous operation patterns of the identified electronic devices, as well as control the operation command corresponding to the gesture to be output to an electronic device having a highest adjustment possibility.

Preferably, the control unit 220 compares the previous operation patterns of the electronic devices corresponding to the gesture according to each recognized detection region to current operation information and determines an electronic device having a larger difference in the comparison as an electronic device having a high adjustment possibility.

In addition, when an operation of the electronic device corresponding to the gesture according to each recognized detection region is controlled by the operation command corresponding to the recognized gesture, the control unit 220 determines whether the operation of each electronic device deviates from the operation pattern and determines an electronic device which does not deviate from the operation pattern (that is, an electronic device which operates within the operation pattern) as the electronic device having the high adjustment possibility.

In addition, the control unit 220 may also receive traveling information and environmental information of the vehicle, identify electronic devices corresponding to a gesture according to each recognized detection region when the number of recognized detection regions is at least two, determine adjustment possibilities of the identified electronic devices based on the operation information and operation patterns of the identified electronic devices, the traveling information of the vehicle, and the environmental information of the vehicle, and control the operation command corresponding to the gesture to be output to an electronic device having a highest adjustment possibility.

The control unit 220 may control the operation command of the electronic device corresponding to the gesture according to each recognized detection region to be displayed when the number of recognized detection regions is at least two and control guide information for guiding the user to select one to be displayed.

The control unit 220 determines whether the operation command of the electronic device corresponding to the gesture in the recognized detection region is an unsuitable operation command. The control unit 220 controls guide information indicating that the operation command is unsuitable to be output to the user. The control unit 220 also controls guide information to be output to the user by determining a possibility that the operation command is an operation command of the electronic device arranged in a region adjacent to the recognized detection region.

Preferably, the control unit 220 compares information of the recognized gesture to gesture information matching with the adjacent region, determines whether there is a region having the same gesture information as the recognized gesture information, and guides that the gesture is to be performed in the region adjacent to the recognized detection region when it is determined that there is a region having the same gesture information as the recognized gesture information.

The control unit 220 may determine a possibility of adjustment by the user using a current operation state and a previous operation pattern of the electronic device having the gesture information matching with the adjacent region. The control unit 220 may provide a guide indicating that the gesture is to be performed in the region adjacent to the recognized detection region when it is determined that there is a possibility.

Also, when the gesture is recognized in the boundary region, the control unit 220 may identify electronic devices having a recognized gesture among electronic devices installed in the recognized boundary region, identify priorities of the identified electronic devices, and control an operation command corresponding to the gesture to be output to an electronic device having higher priority.

The storage unit 230 stores position information of a plurality of regions, information of the plurality of electronic devices positioned in the plurality of regions, and operation commands of the plurality of electronic devices. The storage unit 230 also stores gesture information corresponding to the operation command for controlling each electronic device.

Here, the plurality of electronic devices include at least two devices of an air conditioning device 401 for adjusting an internal temperature of the vehicle 1, an audio device 402 for reproducing a radio sound or a music file, a navigation device 403 for guiding the driver to a destination, a lighting device 404 for adjusting indoor brightness, a Bluetooth device 405 for communicating with an external terminal device, a heater 406 for providing heat to a seat, a window glass opening/closing device 407 for automatically opening/closing window glasses, a sunroof opening/closing device 408 for automatically opening/closing a sunroof, a door opening/closing device 409 for automatically opening/closing front, rear, left, and right doors, and a door lock device (not illustrated) for locking or unlocking the front, rear, left, and right doors.

These electronic devices 401-409 receive commands from the output unit 250. In addition, the operation commands may include a power ON/OFF command for each electronic device and a function adjustment command for each electronic device. Also, the internal space of the vehicle is divided into a plurality of regions, and a plurality of electronic devices are installed in designated regions within the vehicle according to functions. That is, when the plurality of electronic devices are installed in the plurality of regions within the vehicle and a gesture is performed in any one of the plurality of regions, any one or more electronic devices installed in any one region are configured to be controlled by the HMI apparatus 200. Preferably, information of the plurality of regions and information of the electronic devices are associated with each other and stored.

Figure 4:
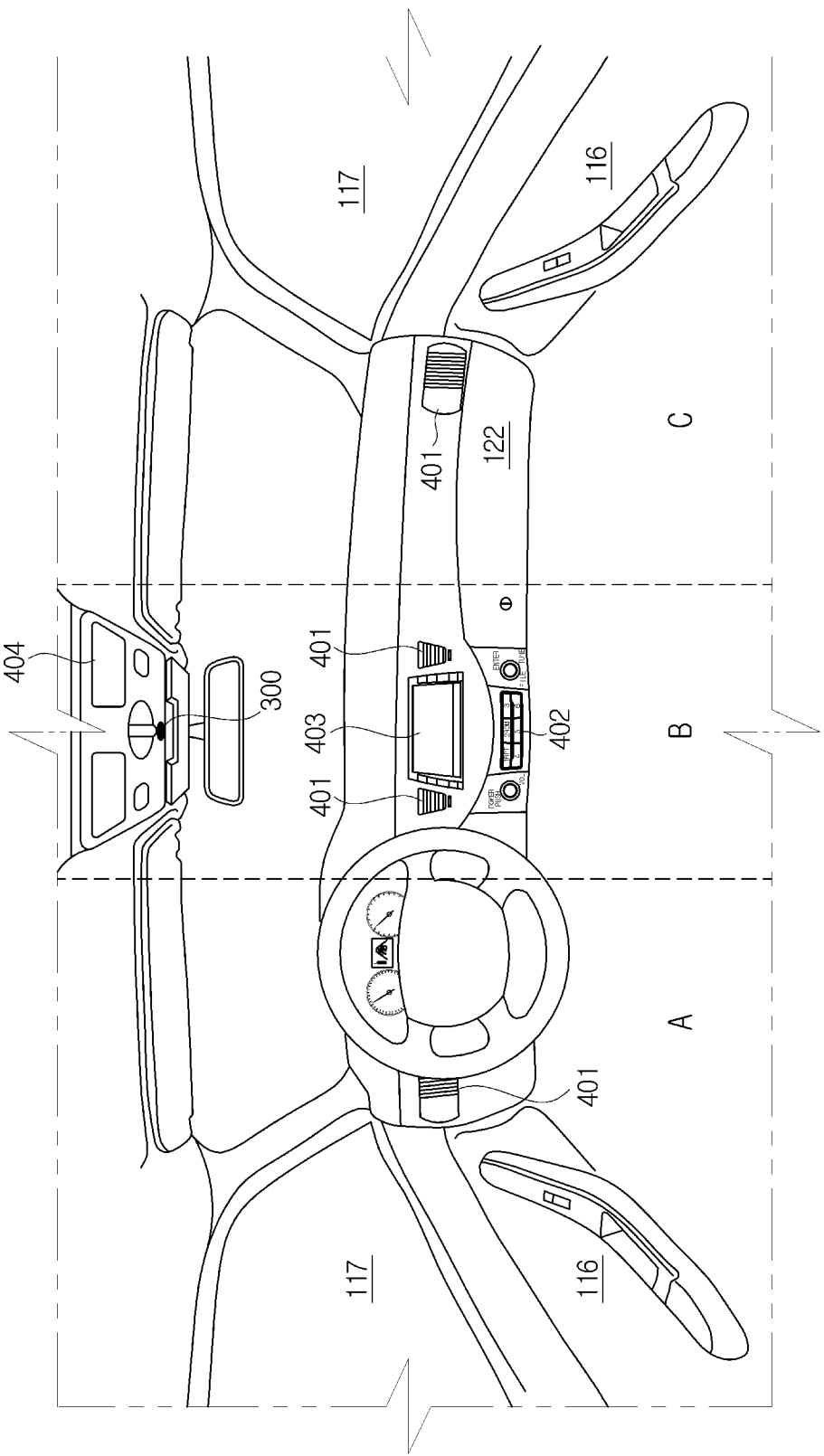
FIG. 4 is an exemplary diagram of a region division of an internal space of the vehicle set in the HMI apparatus according to the embodiment.

Referring additionally to FIG. 4, another interior view of the vehicle 1 is illustrated. The vehicle 1 internally includes a plurality of regions A-C. Here, the plurality of regions include a first region A including a driver's seat, a second region B including a center fascia, and a third region C including a passenger seat. The interior also includes two boundary regions (see FIG. 6): a first boundary region D1, which is a boundary region between the first and second regions A, B; and a second boundary region D2, which is a boundary between the second and third regions B, C.

The first boundary region D1 may include an area from a boundary position between the first and second regions A, B to a position of a given range. Similarly, the second boundary region D2 may include an area from a boundary position between the second and third regions B, C to a position of a given range.

The first region A may include an air volume controller (not illustrated) of the air conditioning device 401, the cluster 123, the Bluetooth device 405, the heater of the driver's seat 406, the door opening/closing device 409 of the driver's seat, the door lock device, and the window glass opening/closing device 407 and the like. The second region B may include the air volume controller (not illustrated) of the air conditioning device 401, the navigation device 403, the audio device 402, the lighting device 404, the sunroof opening/closing device 408, and the like. The third region C may include the air volume controller (not illustrated) of the air conditioning device 4-1, the heater 406 of the passenger seat, the door opening/closing device 409 of the passenger seat, the door lock device, the window glass opening/closing device 407 and the like.

Still referring to FIG. 3, the storage unit 230 stores operation commands of the air volume controller (not illustrated) of the air conditioning device 401, the cluster 123, the Bluetooth device 405, the heater 406 of the driver's seat, the door opening/closing device 409 of the driver's seat, the door lock device, and the window glass opening/closing device 407 installed in the first region A, and stores gesture information corresponding to the operation commands.

In addition, the storage unit 230 stores operation commands of the air volume controller (not illustrated) of the air conditioning device 401, the navigation device 403, the audio device 402, the lighting device 404, the sunroof opening/closing device 408, and the like installed in the second region B, and stores gesture information corresponding to the operation commands.

In addition, the storage unit 230 stores operation commands of the air volume controller (not illustrated) of the air conditioning device 401, the heater 406 of the passenger seat, the door opening/closing device 409 of the passenger seat, the door lock device, and the window glass opening/closing device 407 installed in the third region C, and stores gesture information corresponding to the operation commands.

The storage unit 230 stores previous operation information of the plurality of electronic devices and stores operation patterns based on the previous operation information of the electronic devices. The storage unit 230 may store operation commands of at least two electronic devices corresponding to one gesture. The storage unit 230 may store priorities of electronic devices, the operations of which are controlled according to each boundary region.

The communication unit 240 receives vehicle information and operation information of the plurality of electronic devices 401-409 within the vehicle by performing communication with a vehicle information collection unit 420. The vehicle information collection unit 420 is in communication with the electronic devices 401-409, whether it be wired or wireless. Herein the vehicle information includes traveling information of the vehicle and environmental information of the vehicle. Also, the environmental information of the vehicle 1 includes an internal temperature of the vehicle, an external temperature, and the traveling information of the vehicle includes driving, stopping, and the like.

The operation information of the electronic device includes opening/closing information, ON/OFF information, selection value (for example, volume level, indoor temperature, and radio channel) information of functions, and the like.

The communication unit 240 may perform controller area network (CAN) communication and receive operation information from the vehicle information collection unit or the plurality of electronic devices by communicating with the plurality of electronic devices.

The output unit 250 is connected to the plurality of electronic devices 401-409 and outputs an operation command to at least one electronic device. This output unit 250 may include a digital port, an analog port, and the like to which the plurality of electronic devices are connected. Also, the output unit 250 may include CAN communication for communicating with the plurality of electronic devices.

The vehicle 1 includes an electronic control unit (ECU) 410 for controlling the actuation of the power generating device, the power transfer device, the driving device, the steering device, the braking device, the suspension device, the speed change device, the fuel device, the safety devices, and various sensors. The ECU 410 preferably communicates with the vehicle information collection unit 420. The vehicle information collection unit 420 may be provided in the HMI apparatus.

The vehicle 1 may further include an input unit 430 for receiving an input of an operation command from the user and a display unit 440 for displaying operation information. The input unit 430 may be implemented in a button scheme, a touch scheme, or a dial scheme. This input unit 430 may receive an input of an ON/OFF command of the HMI apparatus and the display unit 440 may display a gesture recognition result. Also, the input unit 430 and a display unit 440 may be provided in the HMI apparatus 200 or an external terminal device (for example, the navigation device).

That is, the input unit 430 and the display unit 440 provided in the external terminal device may receive an input of an operation command of the HMI apparatus 200 by communicating with the HMI apparatus 200 and display an operation state of the HMI apparatus 200, a gesture recognition result, gesture guide information, nonconformity guide information, and the like.

Figure 5:
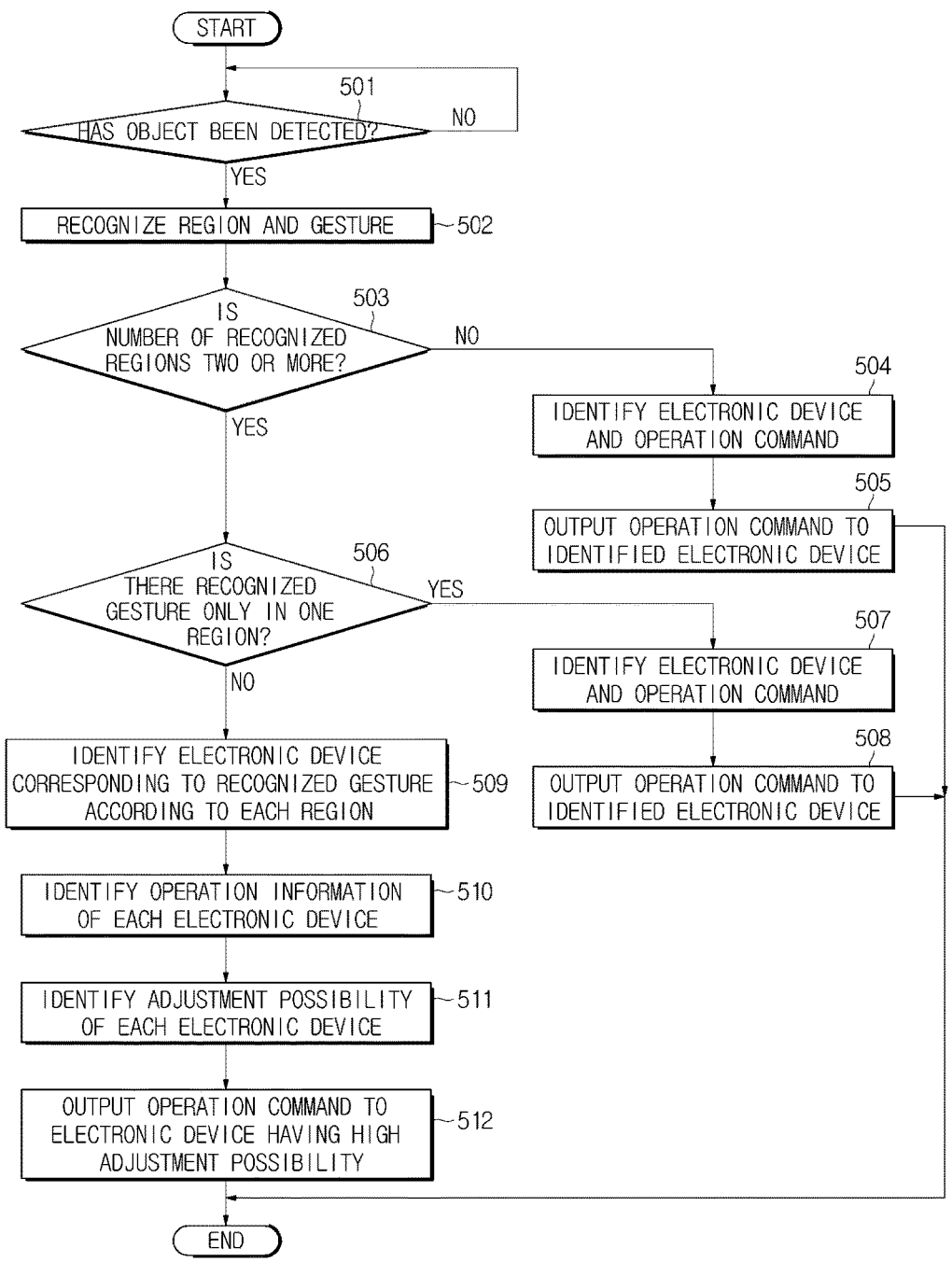
FIG. 5 is a flowchart diagram of the HMI apparatus according to the embodiment.

Referring now to FIG. 5, a control flowchart of the HMI apparatus 200 according to the subject technology is shown. The control flowchart will be described with additional reference to FIGS. 6 to 13. A control method of the HMI apparatus 200 arranged in the vehicle will be described.

At step (501), the HMI apparatus 200 determines whether an object is detected based on a detection signal transmitted by the detection unit 300. The HMI apparatus 200 acquires a shape of the detected object when it is determined that the object is detected from the internal space of the vehicle 1, and determines whether the detected object is an object for gesture recognition based on the acquired shape of the object. If no gesture is detected, the method loops back to continually check for gestures.

When it is determined that the object for the gesture recognition is detected at step (501), the HMI apparatus 200 acquires motion of the object and proceeds to step (502). The HMI apparatus 200 recognizes a gesture based on the acquired motion and shape of the object, and recognizes a detection region in which the object is detected at step (502).

When the detection unit 300 is a camera, an operation example of the HMI apparatus 200 will be described. The HMI apparatus 200 processes an image collected by the camera and determines whether the object for the gesture recognition is present in the processed image. The HMI apparatus 200 recognizes a gesture by reflecting the motion in the shape of the object when it is determined that the object for the gesture recognition is present in the image.

The HMI apparatus 200 also identifies a position of the object within the image, and recognizes a region corresponding to the identified position.

At step (503), the HMI apparatus 200 determines whether the number of recognized detection regions is two or more. If the number of recognized detection regions is one, the method proceeds to step (504) where the HMI apparatus 200 identifies an operation command of an electronic device corresponding to the recognized gesture. Then, at step (505) the HMI apparatus 200 outputs the identified operation command to the identified electronic device.

Figure 6:
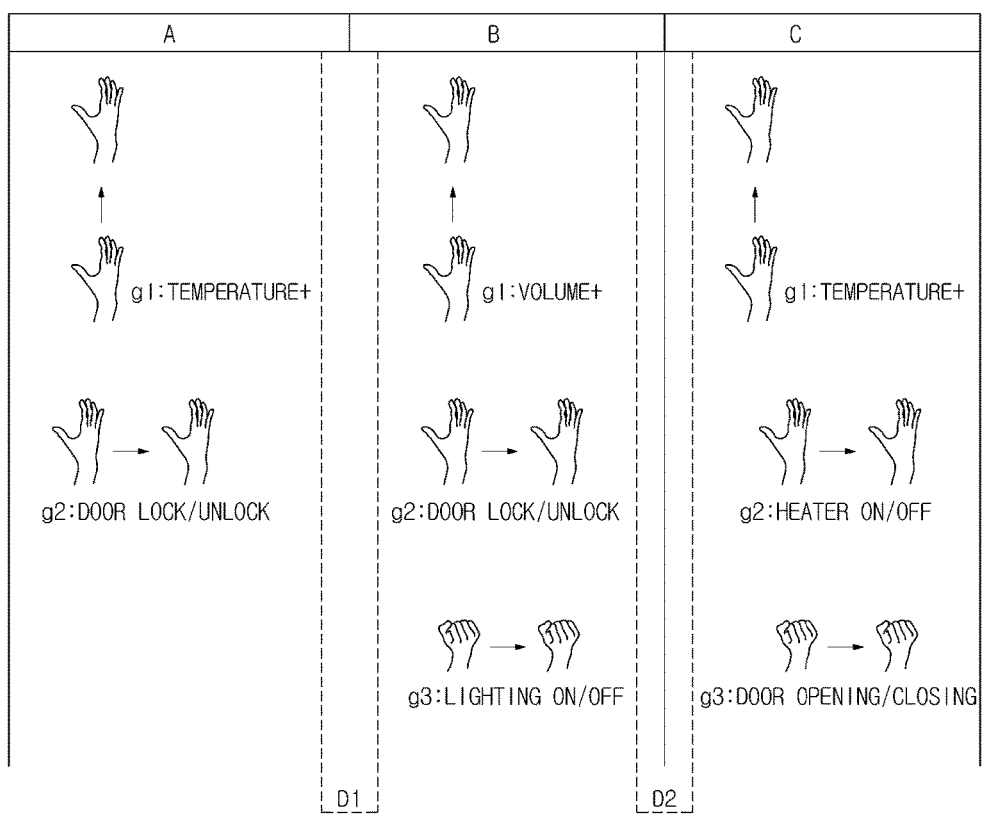
FIG. 6 is an exemplary diagram of region-specific gestures and operation commands of electronic devices set in the HMI apparatus according to the embodiment.
Figure 7:
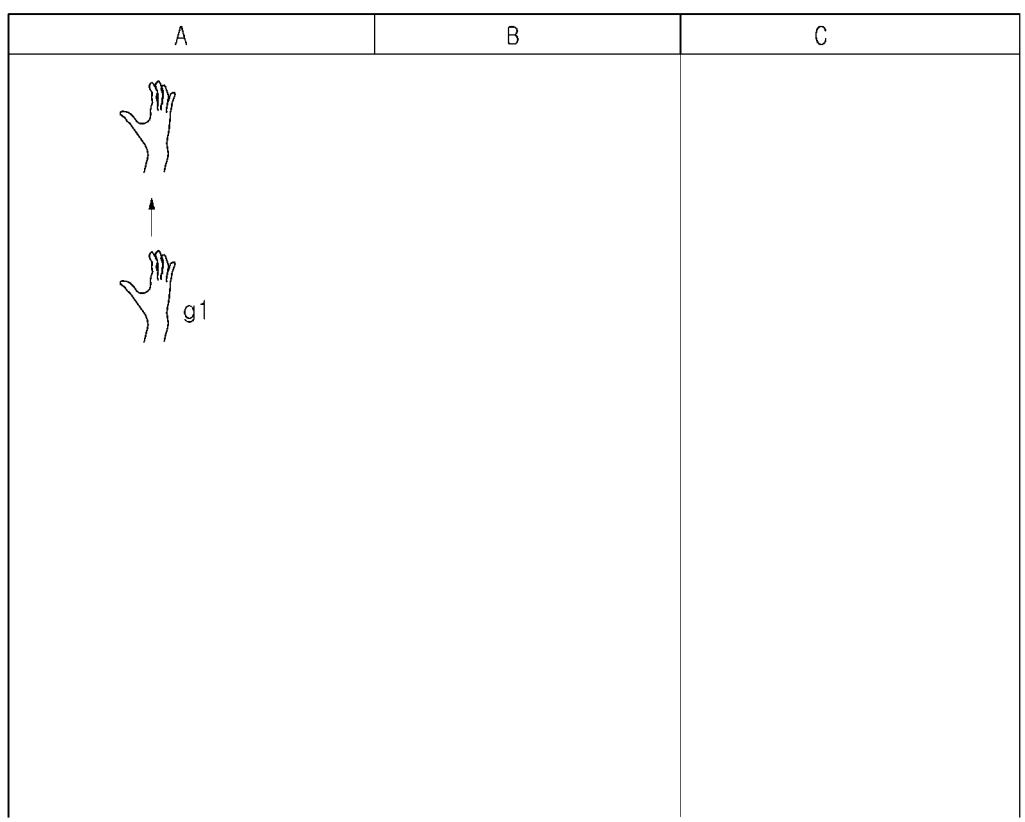
FIGS. 7 to 13 are exemplary diagrams of gesture recognition of the HMI according to the embodiment.

Still referring to FIG. 5, but particularly along with FIGS. 6 and 7, detailed description of exemplary gestures follows. As illustrated in FIG. 6, in the HMI apparatus 200, an operation command of an electronic device 401-409 may be set according to each region A-C and a gesture may be set according to each operation command. This will be described with an example.

The HMI apparatus 200 stores: an operation command of the air conditioning device 401 and an operation command of the door lock device matching with the first region A; an operation command of the audio device 402, an operation command of the lighting device 404, and an operation command of the navigation device 403 matching with the second region B; and an operation command of the air conditioning device 401, an operation command of the door opening/closing device 409 arranged in the passenger seat, and an operation command of the heater 406 within the passenger seat matching with the third region C.

In this HMI apparatus 200, a first gesture g1 corresponding to an operation command for increasing a target temperature of the air conditioning device 401 matching with the first region A by one level (for example, 0.5° C.) is set and a second gesture g2 corresponding to an operation command for locking or unlocking the door lock device 409 matching with the first region A is set.

In addition, in the HMI apparatus 200, a first gesture g1 corresponding to an operation command for increasing the volume of the audio device 402 matching with the second region B by one level is set, a second gesture g2 corresponding to an operation command for controlling the navigation device 403 matching with the second region B to be turned on/off is set, and a third gesture g3 corresponding to the operation command for controlling the lighting device 404 matching with the second region B to be turned on/off is set.

In addition, in the HMI apparatus 200, a first gesture g1 corresponding to an operation command for increasing a target temperature of the air conditioning device 401 matching with the third region C by one level (for example, 0.5° C.) is set, a second gesture g2 corresponding to an operation command for controlling the heater 406 matching with the third region C to be turned on/off is set, and a third gesture g3 corresponding to an operation command for controlling the door opening/closing device 409 matching with the third region C to open and close the door is set.

As can be seen in FIG. 6, the first gesture g1 has a shape of an open hand in which all fingers are stretched and motion of the hand moving upward. The second gesture g2 has the shape of the open hand and motion of the hand moving from the left to the right. The third gesture g3 has a shape of a first hand in which all the fingers are retracted and motion of the hand moving from the left to the right.

In this manner, the HMI apparatus 200 periodically checks whether an object for gesture recognition inside the vehicle is detected in a state in which the operation command of the electronic device is set for the gesture for every region.

As illustrated in FIGS. 6 and 7, the HMI apparatus 200 identifies a region in which the first gesture g1 occurs when the first gesture g1 is recognized. At this time, when it is determined that the gesture g1 is recognized in only the first region A, a target temperature increase command is output to the air conditioning device 401 so as to increase the target temperature of the driver's seat by one level (for example, 0.5° C.). At this time, the air condition device 401 controls the air volume controller (not illustrated) provided on the driver's seat side to control an air volume and causes the target temperature of the driver's seat to be increased.

Also, the air conditioning device 401 may store a target temperature adjusted by the user so as to acquire the operation pattern of the air conditioning device and provide operation information stored in the vehicle information collection unit later 420. When the operation command is output to the identified electronic device, the HMI apparatus 200 may determine conformity of the operation command based on the operation information of the identified electronic device and output a determination result as guide information to the user.

At this time, the HMI apparatus 200 may determine a possibility of an operation command of an electronic device installed in a region adjacent to the recognized detection region. Preferably, the HMI apparatus may determine whether there is a gesture matching a recognized gesture among gestures corresponding to operation commands of electronic devices installed in the adjacent region and control guide information representing that the matching gesture is present to be output to the user when it is determined that the matching gesture is present.

For example, when it is assumed that an internal temperature of the vehicle 1 in the summertime is 30° C. and the target temperature is 29° C., the HMI apparatus 200 controls guide information indicating nonconformity for operation control of the air conditioning device 401 to be output if it is determined that the first gesture for increasing the temperature is recognized in a state in which the internal temperature is higher than the target temperature.

In addition, the HMI apparatus 200 may determine whether there is an electronic device having an operation command corresponding to the first gesture among electronic devices installed in the second region adjacent to the first region when it is determined that the temperature increase command of the air conditioning device 401 is unsuitable. The HMI apparatus 200 may output guide information for identifying whether the operation command is a volume level-up command of the audio device corresponding to the first gesture when it is determined that the electronic device having the operation command corresponding to the first gesture is present. In this manner, the HMI apparatus 200 identifies an operation command of an electronic device corresponding to the recognized detection region and the recognized gesture and outputs the operation command to the identified electronic device, so that the electronic device may be controlled according to the user's intention.

Still referring to FIG. 5, at step (503), when the number of recognized detection regions is two or more, the method proceeds to step (506). At step (506), the HMI apparatus 200 determines whether the operation commands of the electronic devices corresponding to the gesture according to each recognized detection region are set. At this time, when it is determined that the operation command corresponding to the recognized gesture is set in only one region, the HMI apparatus 200 determines that the gesture performed by the user is a gesture performed in one region. Thus, the HMI apparatus 200 proceeds to step (507) and identifies the operation command of the electronic device corresponding to one region and a gesture. At step (508), the HMI apparatus 200 outputs the operation command to the identified electronic device.

Figure 8:
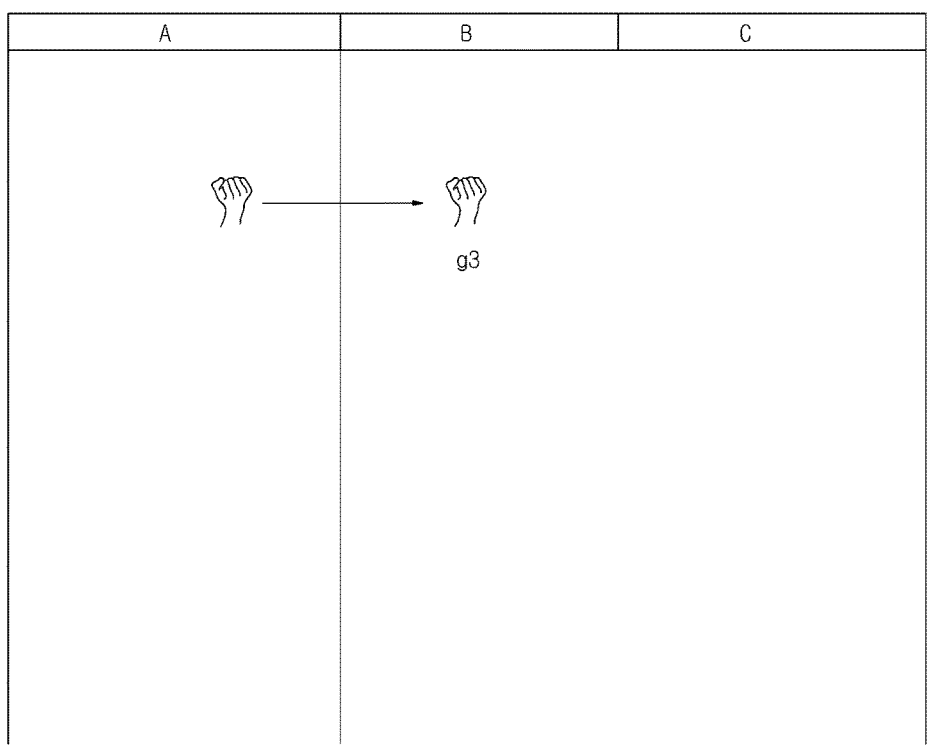

As illustrated in FIGS. 6 and 8, the HMI apparatus 200 identifies a region in which the third gesture g3 occurs when the third gesture g3 is recognized. At this time, when it is determined that the third gesture g3 is recognized in the first region A and the second region B, the HMI apparatus 200 determines whether there is an electronic device, the operation of which is controlled by the third gesture g3, among electronic devices matching with the first region A and determines whether there is an electronic device, the operation of which is controlled by the third gesture g3, among electronic devices matching with the second region B.

When it is determined that the operation of the electronic device matching with the second region is controlled by the third gesture g3, that is, when it is determined that the operation command of the electronic device corresponding to the third gesture g3 is set in only the second region, the HMI apparatus 200 outputs the ON/OFF operation command to the lighting device 404 installed in the second region B. Preferably, the HMI apparatus 200 outputs the operation command based on the operation state of the lighting device 404. That is, the HMI apparatus 200 may output an OFF command when the operation state of the lighting device 404 is turned on and output an ON command when the operation state of the lighting device 404 is turned off.

On the other hand, the HMI apparatus 200 may recognize gestures in more than one region at step (506) and, thus, proceed to step (509). At step (509), the HMI apparatus 200 identifies electronic devices corresponding to the gesture according to each recognized detection region when it is determined that the number of recognized detection regions is at least two. The HMI apparatus 200 determines adjustment possibilities of the electronic devices based on at least one of pieces of current operation information, such as operation information at step (510), operation patterns of the identified electronic devices, and traveling information and environmental information of the vehicle, such as adjustment possibilities at step (511). The operation information of the electronic device includes opening/closing information, ON/OFF information, selection value (for example, volume level, indoor temperature, and radio channel) information of functions, and the like. Next, the method proceeds to step (512) where the HMI apparatus 200 outputs an operation command corresponding to the gesture to the electronic device having a highest adjustment possibility.

Figure 9:
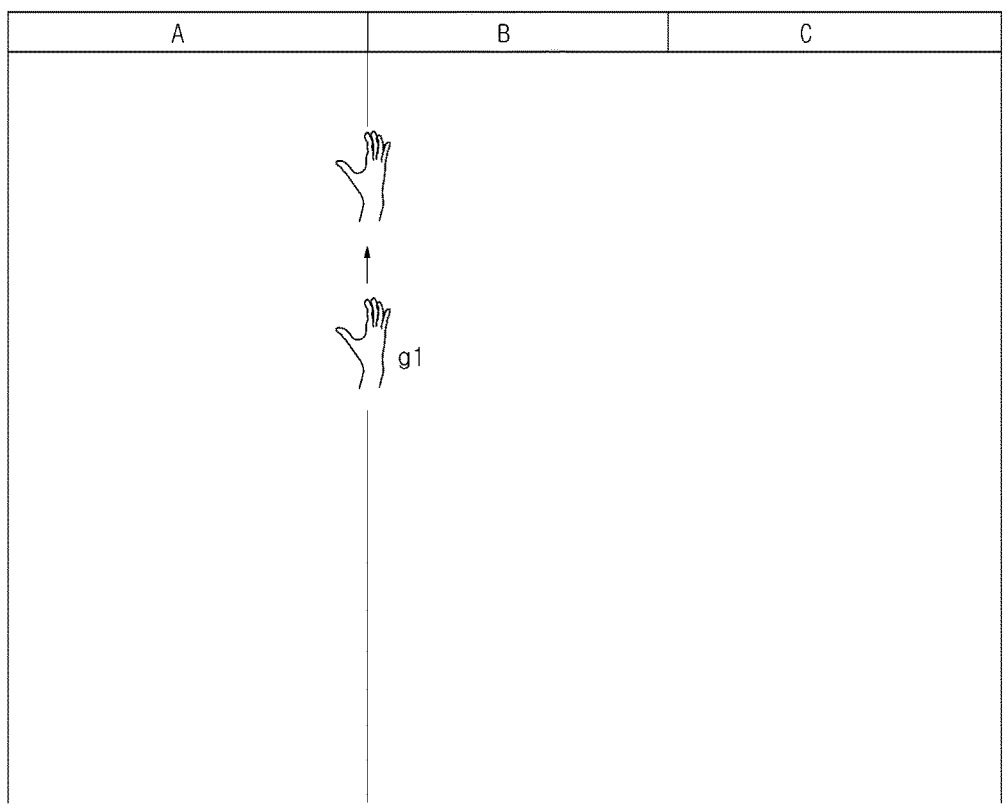

As illustrated in FIGS. 6 and 9, the HMI apparatus 200 identifies a region in which the first gesture g1 occurs when the first gesture g1 is recognized. At this time, when it is determined that the first gesture g1 is recognized in the first region A and the second region B, the HMI apparatus 200 determines whether there is an electronic device, the operation of which is controlled by the first gesture g1, among the electronic devices matching with the first region A and determines whether there is an electronic device, the operation of which is controlled by the first gesture g1, among the electronic devices matching with the second region B.

When it is determined that the operation of the electronic device matching with each of the first region A and the second region B is controlled by the first gesture g1, that is, when it is determined that all operation commands of the electronic devices corresponding to the first gesture g1 are set in the first and second regions, the HMI apparatus 200 determines adjustment possibilities of the electronic devices by identifying the operation information of the air conditioning device 401 matching with the first region A and identifying the operation information of the audio device 402 matching with the second region B.

When the adjustment possibilities are determined, the HMI apparatus 200 may use other information in addition to current operation information. At this time, an operation pattern, traveling information and environmental information of the vehicle 1 are used according to a type of electronic device.

For example, the HMI apparatus 200 may determine the adjustment possibility by additionally using the environmental information of the vehicle 1 when the electronic device having the operation command corresponding to the gesture g1 is the air conditioning device 401, determine the adjustment possibility by additionally using the environmental information of the vehicle 1 and the operation pattern when the electronic device having the operation command corresponding to the gesture g1 is the audio device 402, and determine the adjustment possibility by additionally using the traveling information of the vehicle 1 when the electronic device having the operation command corresponding to the gesture g1 is the door opening/closing device 409 or the door lock device.

Accordingly, the HMI apparatus 200 acquires a temperature difference by comparing the internal temperature of the vehicle 1 which is the environmental information of the vehicle 1 to the target temperature and determines the adjustment possibility of the air conditioning device based on the acquired temperature difference. At this time, it is possible to increase a weight value of the adjustment possibility according to the temperature difference. In addition, the HMI apparatus 200 acquires a volume level difference by comparing a current volume level of the audio device 402 to a volume pattern of the audio device 402 and determines the adjustment possibility of the audio device 402 based on the acquired volume level difference. At this time, it is possible to increase a weight value of the adjustment possibility according to the volume level difference. Also, in the HMI apparatus 200, the weight value corresponding to the temperature difference or the volume level difference may be preset.

The HMI apparatus 200 compares the adjustment possibility of the air conditioning device 401 to the adjustment possibility of the audio device 402, determines an electronic device having a higher adjustment possibility based on a comparison result, determines the determined electronic device as a user-intended electronic device, and outputs the operation command corresponding to the first gesture g1 to the determined electronic device. For example, it may be determined that the adjustment possibility of the air conditioning device is 80% because a temperature difference is 2° C. when the internal temperature of the vehicle is 20° C. and the target temperature is 18° C., and it may be determined that the adjustment possibility of the audio device is 50% because a volume difference is 1 when the volume level of the audio device is 6 and the average volume level is 5. Accordingly, the HMI apparatus 200 may output a target temperature increase command to the air conditioning device 401. Preferably, the HMI apparatus 200 enables a user-intended operation command to be accurately input by outputting the determination result and the guide information using the display unit 440.

Figure 10:
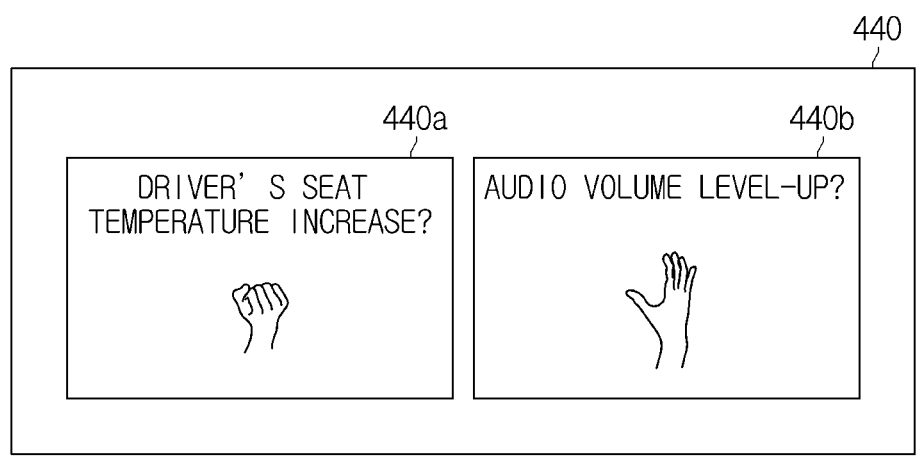

As illustrated in FIG. 10, the HMI apparatus 200 displays region-specific determination results on different guide windows 440a, 440b on the display unit 440. The display unit 440 displays guide information indicating that the air conditioning temperature increase command for the driver's seat is recognized along with gesture information for receiving an input of a confirm command on a first guide window 440a. The display unit 440 displays guide information indicating that a volume level-up command is recognized and gesture information for receiving an input of a confirm command on a second guide window 440b. Then, the HMI apparatus 200 outputs the air conditioning temperature increase command of the driver's seat or the volume level-up command of the audio device based on the recognized gesture.

Figure 11:
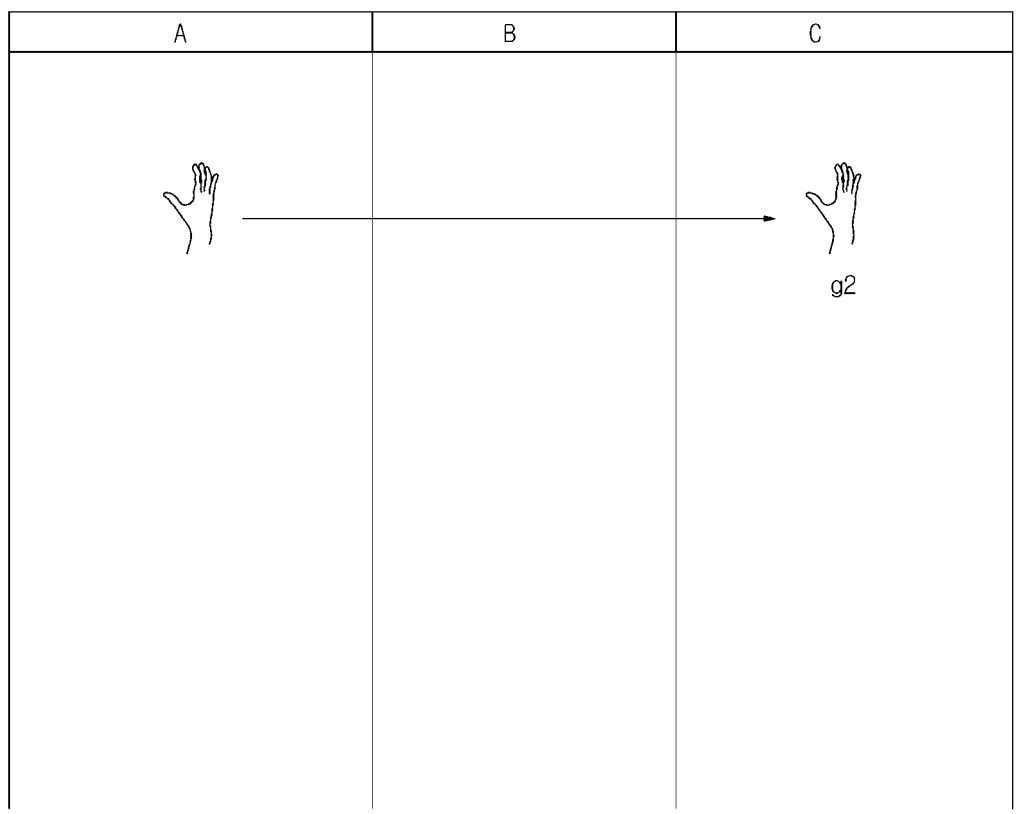

Also, the case in which the number of boundary regions in which the gesture g2 is recognized is two, that is, the case in which the gesture is recognized in three regions, will be described with reference to FIGS. 6 and 11. As illustrated in FIG. 11, the HMI apparatus 200 identifies a region in which the second gesture g2 occurs when the second gesture g2 is recognized. At this time, when it is determined that the second gesture g2 is recognized in the first region A, the second region B, and the third region C, the HMI apparatus 200 determines whether there is an electronic device, the operation of which is controlled by the second gesture g2, among electronic devices matching with the first, second, and third regions A-C.

When it is determined that the operations of the electronic devices matching with all the first region A, the second region B, and the third region C are controlled by the second gesture g2, that is, when it is determined that the operation commands of the electronic devices corresponding to the second gesture g2 are set in the first, second, and third regions A-C, the HMI apparatus 200 determines the adjustment possibility of each electronic device by identifying operation information of the door lock device matching with the first region A, identifying operation information of the navigation device 403 matching with the second region B, and identifying operation information of the heater 406 matching with the third region C.

The HMI apparatus 200 determines the adjustment possibility of the door lock device of the driver's seat door based on the traveling information of the vehicle 1 and the lock state of the door, determines the adjustment possibility of the navigation device 403 based on the traveling information of the vehicle 1 and the operation state of the navigation device 403, and determines the adjustment possibility of the heater 406 of the passenger seat based on boarding information of the passenger and the internal temperature of the vehicle 1 which is the environmental information of the vehicle 1.

For example, the HMI apparatus 200 may determine that the adjustment possibility of an operation of the door lock device is 20% when the vehicle 1 is driving and the door of the driver's seat is in a locked state, determine that the adjustment possibility of an operation of the navigation device 403 is 70% when the navigation device 403 is turned off, and determine that that the adjustment possibility of an operation of the heater 406 of the passenger seat is 5% when there is no passenger in the passenger seat. Accordingly, the HMI apparatus 200 outputs an ON command to the navigation device 403 having a highest adjustment possibility that an operation will be adjusted.

Figure 12:
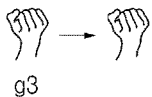

Referring now to FIG. 12 as an example, when it is determined that there is no operation command corresponding to a gesture g3 recognized in the first region A, the HMI apparatus 200 may determine a possibility of an operation command of the electronic device installed in a region B adjacent to the region A in which the gesture g3 is recognized. In other words, the HMI apparatus 200 may determine whether there is a gesture matching the recognized gesture among gestures corresponding to the operation commands of the electronic devices installed in the adjacent region and control guide information indicating that the matching gesture is present to be output to the user.

For example, the HMI apparatus 200 determines whether there is an electronic device having the third gesture g3 among electronic devices installed in the first region A when the third gesture g3 is recognized in the first region A, and provides a guide of a gesture recognition error to the user when it is determined that there is no electronic device having the third gesture g3 among the electronic devices installed in the first region A. In this case, the HMI apparatus 200 will preferably determine whether there is an electronic device having the third gesture g3 in the second region B adjacent to the first region A and output guide information for asking the user for a gesture in the second region B to the user when it is determined that the electronic device having the third gesture g3 is present in the second region B. That is, the HMI apparatus 200 may output the guide information for asking for the gesture for controlling the lighting device 404 of the second region B.

In addition, although the HMI apparatus 200 outputs the operation command to any one of electronic devices installed in a region including a boundary region when the gesture is recognized in the boundary region, it is also possible to identify an electronic device having highest priority based on preset priorities and output the operation command to the identified electronic device, which is now described with reference to FIGS. 6 and 13. The HMI apparatus 200 stores the priorities of the electronic devices to be controlled at the time of gesture recognition in a first boundary region D1 and stores the priorities of the electronic devices to be controlled at the time of gesture recognition in a second boundary region D2. Such priorities may be user selectable by the driver.

That is, the HMI apparatus 200 stores the priorities of the electronic devices installed in the first and second regions A, B including the first boundary region D1 according to each gesture and stores the priorities of the electronic devices installed in the second and third regions B, C including the second boundary region D2 according to each gesture.

Figure 13:
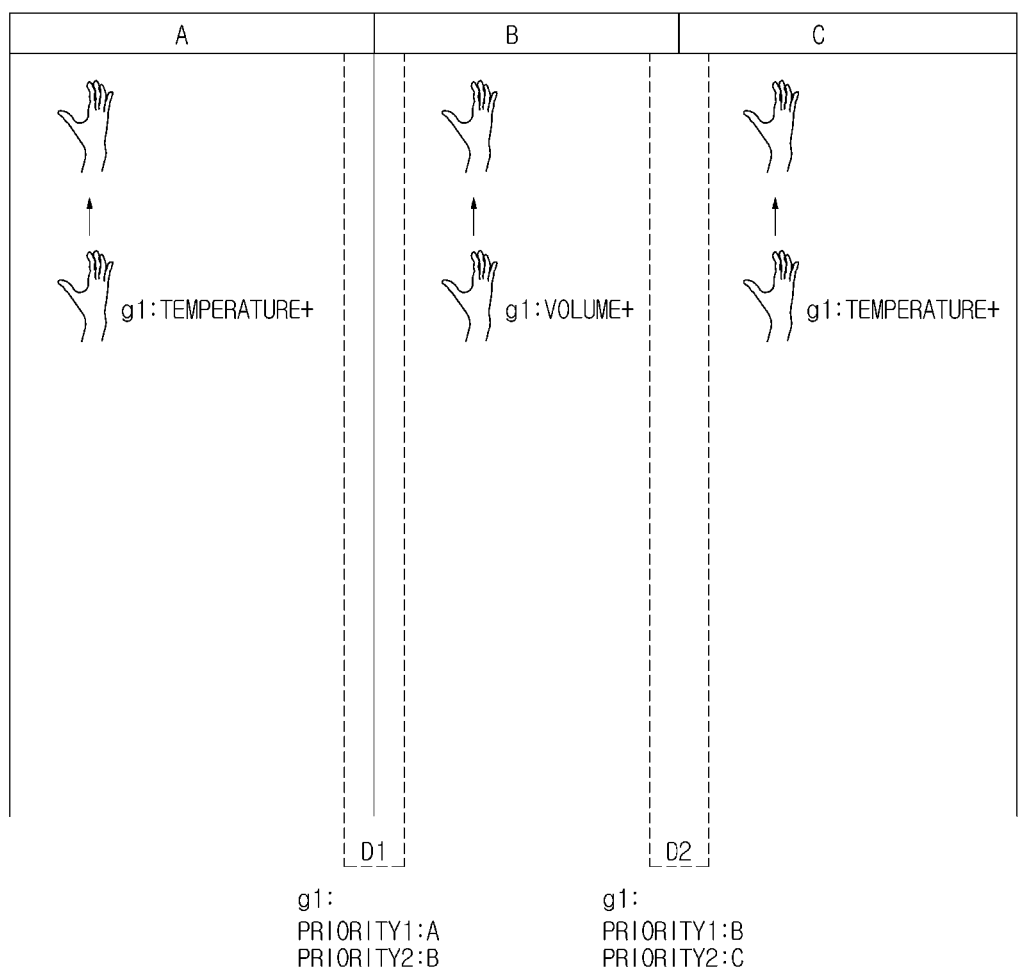

As illustrated in FIG. 13, at the time of recognition of the first gesture g1 in the first boundary region A, the HMI apparatus 200 identifies the priorities of two electronic devices after identifying the electronic device having a first gesture g1 among the electronic devices installed in the first region A and identifying the electronic device having the first gesture g1 among the electronic devices installed in the second region B. The HMI apparatus 200 outputs the operation command corresponding to the gesture g1 to the electronic device installed in the first region A because the electronic device installed in the first region A is higher priority than the electronic device installed in the second region B.

In addition, at the time of recognition of the first gesture g1 in the second boundary region B, the HMI apparatus 200 identifies the priorities of two electronic devices after identifying the electronic device having a first gesture g1 among the electronic devices installed in the second region B and identifying the electronic device having the first gesture g1 among the electronic devices installed in the third region C. At this time, the HMI apparatus 200 outputs the operation command corresponding to the gesture g1 to the electronic device installed in the second region B because the electronic device installed in the second region B is higher priority than the electronic device installed in the third region C.

Also, although the configuration in which the operation command is output to an electronic device arranged in each region has been described in an exemplary embodiment, it is possible to output the operation command to the electronic device arranged in another region according to a gesture input after setting operation commands and gestures of electronic devices arranged in the other region when it is necessary to control the electronic device arranged in the other region from one region because the driver may desire to open the window glass of the passenger seat or automatically open the door of the passenger seat in a state in which the driver sits in the driver's seat.

Figure 14:
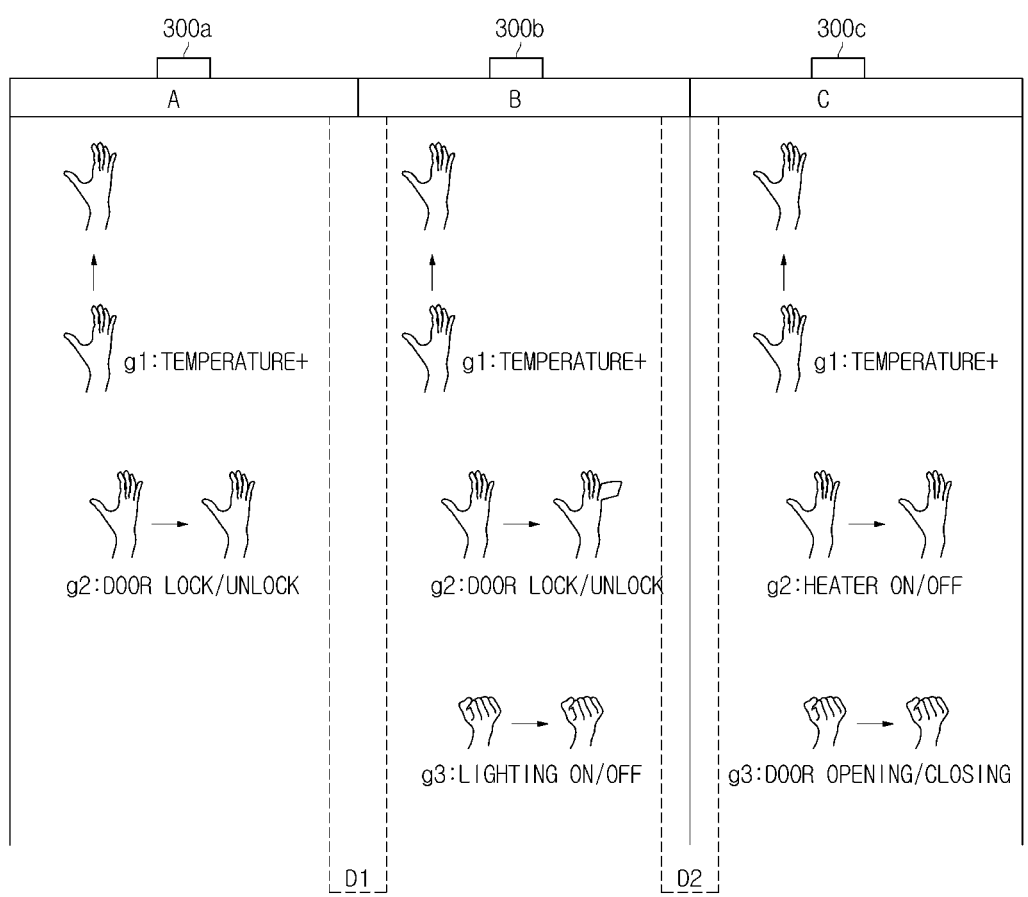
FIG. 14 is an exemplary diagram of an HMI apparatus a plurality of detection units according to another embodiment.

FIG. 14 is an exemplary diagram of an HMI apparatus 200 according to another embodiment with a plurality of detection units 300a, 300b, 300c. The HMI apparatus 200 may receive detection signals from a plurality of detection units 300a, 300b, 300c for detecting a gesture according to each region A-C, respectively.

The HMI apparatus 200 acquires an object based on the detection signals transmitted from the plurality of detection units 300a, 300b, and 300c and recognizes the gesture based on information of the acquired object.

When at least one of the plurality of detection units detects the object, the HMI apparatus 200 identifies: a region matching with the detection unit by which the object is detected; and identifies the electronic device having a recognized gesture among electronic devices installed in the identified region. The HMI apparatus 200 also outputs an operation command corresponding to the recognized gesture to the identified electronic device.

The HMI apparatus 200 identifies: regions matching with at least two detection units by which the object is detected among the plurality of detection units; and electronic devices having the recognized gesture among the electronic devices installed in the identified regions. The HMI apparatus 200 also determines an adjustment possibility of each electronic device based on at least one of pieces of operation information and operation patterns of the identified electronic devices and the environmental information and the traveling information of the vehicle 1. Still further, the HMI apparatus 200 determines the electronic device having a high adjustment possibility as a determination result, and outputs an operation command corresponding to the gesture to the determined electronic device. Preferably, because a configuration in which the electronic device having the high adjustment possibility is determined is the same as that of the above-described embodiment, further description thereof is omitted.

Also, the HMI apparatus 200 may control the operation command of the electronic device corresponding to the gesture according to each region to be displayed when the object is detected by two detection units and control guide information for guiding the user to select one to be displayed.

The HMI apparatus 200 may determine whether the operation command of the electronic device corresponding to the region-specific gesture is an unsuitable operation command, control guide information indicating that the operation command is unsuitable to be output to the user, and control guide information to be output to the user by determining a possibility that the operation command is an operation command of the electronic device arranged in a region adjacent to the recognized detection region.

It is envisioned that when the object is detected by two detection units, the HMI apparatus 200 may identify electronic devices having a recognized gesture among electronic devices installed in the recognized boundary region, identify priorities of the identified electronic devices, and control an operation command corresponding to the gesture to be output to an electronic device having higher priority.

The storage unit of the HMI apparatus 200 may store position information of a plurality of regions, information of detection units installed in each of the plurality of regions, information of a plurality of electronic devices positioned in the plurality of regions, operation commands of the plurality of electronic devices, and gesture information corresponding to the operation command for controlling each electronic device along with all the necessary data to accomplish the subject technology described and suggested herein.

Although a few embodiments of the present technology have been shown and described, it would be appreciated by those skilled in the art that changes may be made in these embodiments without departing from the principles and spirit of the invention, the scope of which is defined in the claims and their equivalents.

What is claimed is:

1. A vehicle having a human machine interface (HMI) apparatus configured to output an operation command of a user to at least one of a plurality of electronic devices, the HMI apparatus comprising:
    a storage unit configured to store position information of a plurality of regions, operation commands of the plurality of electronic devices positioned in the plurality of regions, and gesture information of the operation commands;
    a recognition unit configured to recognize a gesture of the user; and
    a control unit configured to identify electronic devices installed in a region adjacent to a boundary region when the gesture is recognized in the boundary region of the plurality of regions, determine adjustment possibilities of the identified electronic devices based on at least one of operation information and pre-stored operation patterns of the identified electronic devices, traveling information of the vehicle, and environmental information of the vehicle, and control the operation command corresponding to the gesture to be output to an electronic device having a highest adjustment possibility among the determined adjustment possibilities, wherein
    when an operation of the identified electronic devices is controlled by the operation command corresponding to the recognized gesture, the control unit is further configured to determine whether the operation of any of the identified electronic devices deviates from the pre-stored operation patterns and determine an electronic device which operates within the pre-stored operation patterns as the electronic device having the highest adjustment possibility,
    the control unit is further configured to identify the electronic devices corresponding to the gesture according to each adjacent region, identify values of functions corresponding to the respective operation patterns of the identified electronic devices, compare the identified values of functions corresponding to the respective operation patterns of the identified electronic devices with values of functions corresponding to respective current operation information of the identified electronic devices, and based on the comparison, determine an electronic device with the largest difference as the electronic device having the highest adjustment possibility, and
    the boundary region includes a region within a given range at a position at which at least two regions of the plurality of regions are adjacent to each other.

2. The vehicle according to claim 1, wherein the control unit identifies priorities of the electronic devices having the gesture according to each adjacent region and outputs the operation command corresponding to the gesture to an electronic device having highest priority.

3. The vehicle according to claim 1, wherein:
    the plurality of electronic devices include at least two devices of an air conditioning device, an audio device, a navigation device, a lighting device, a Bluetooth device, a heater within a seat, a window glass opening/closing device, a sunroof opening/closing device, a door opening/closing device, and a door lock device, and
    the operation command includes a power ON/OFF command and a function adjustment command.

4. The vehicle according to claim 1, wherein, when the gesture is recognized in one region, the control unit identifies an electronic device having the gesture among electronic devices installed in the one region and controls the operation command corresponding to the gesture to be output to the identified electronic device.

5. The vehicle according to claim 1, further comprising a detection unit configured to detect an object for the gesture.

6. A vehicle having a plurality of electronic devices, the vehicle comprising:
    a plurality of detection units arranged in a plurality of regions; and
    a human machine interface (HMI) apparatus configured to output an operation command of a user to the plurality of electronic devices arranged in the plurality of regions, wherein
    the HMI apparatus includes:
        a storage unit configured to store position information of the plurality of regions, operation commands of the plurality of electronic devices arranged in the plurality of regions, and gesture information of the operation commands;
        a recognition unit configured to recognize a gesture of the user; and
        a control unit configured to identify a region in which a detection unit recognizing the gesture is arranged when the gesture is identically recognized in the plurality of detection units, identify electronic devices installed in the identified region, determine adjustment possibilities of the identified electronic devices based on at least one of operation information and pre-stored operation patterns of the identified electronic devices, traveling information of the vehicle, and environmental information of the vehicle, and control the operation command corresponding to the gesture to be output to an electronic device having a highest adjustment possibility among the determined adjustment possibilities,
    when an operation of the identified electronic devices is controlled by the operation command corresponding to the recognized gesture, the control unit is further configured to determine whether the operation of any of the identified electronic devices deviates from the pre-stored operation patterns and determine an electronic device which operates within the pre-stored operation patterns as the electronic device having the highest adjustment possibility, and the control unit is further configured to identify the electronic devices corresponding to the gesture according to each adjacent region, identify values of functions corresponding to the respective operation patterns of the identified electronic devices, compare the identified values of functions corresponding to the respective operation patterns of the identified electronic devices with values of functions corresponding to respective current operation information of the identified electronic devices, and based on the comparison, determine an electronic device with the largest difference as the electronic device having the highest adjustment possibility.

7. A control method of a vehicle having a plurality of electronic devices and an HMI apparatus configured to output an operation command of a user to at least one of the plurality of electronic devices, the control method comprising the steps of:

detecting an object;

recognizing a detection region and a gesture of the detected object;

identifying electronic devices installed in a region adjacent to a boundary region when it is determined that the gesture is recognized in the boundary region of a plurality of regions;

determining adjustment possibilities of the identified electronic devices based on at least one of operation information and pre-stored operation patterns of the identified electronic devices, traveling information of the vehicle, and environmental information of the vehicle;

when an operation of the identified electronic devices is controlled by the operation command corresponding to the recognized gesture, determining whether the operation of any of the identified electronic devices deviates from the pre-stored operation patterns;

determining an electronic device which operates within the pre-stored operation patterns as an electronic device having a highest adjustment possibility among the determined adjustment possibilities; and outputting the operation command corresponding to the electronic device having the highest adjustment possibility, wherein the boundary region includes a region within a given range at a position at which at least two regions of the plurality of regions are adjacent to each other, and the determining adjustment possibilities of the identified electronic devices comprises:

identifying the electronic devices corresponding to the gesture according to each adjacent region, identifying values of functions corresponding to the respective operation patterns of the identified electronic devices, comparing the identified values of functions corresponding to the respective operation patterns of the identified electronic devices with values of functions corresponding to respective current operation information of the identified electronic devices, and based on the comparison, determining an electronic device with the largest difference as the electronic device having the highest adjustment possibility.

8. The control method of the vehicle according to claim 7, wherein the outputting of the operation command corresponding to the gesture to any one of the identified electronic devices includes:

identifying priorities of the electronic devices having the gesture according to each adjacent region; and outputting the operation command corresponding to the gesture to an electronic device having highest priority.

9. The control method of the vehicle according to claim 7, wherein the outputting of the operation command corresponding to the gesture to any one of the identified electronic devices includes:

identifying operation information of electronic devices corresponding to the gesture according to each adjacent region;

receiving traveling information and environmental information of the vehicle;

determining adjustment possibilities of the identified electronic devices based on the operation information of the identified electronic devices, the traveling information, and the environmental information; and outputting the operation command corresponding to the gesture to an electronic device having a highest adjustment possibility.

10. The control method of the vehicle according to claim 7, wherein the outputting of the operation command corresponding to the gesture to any one of the identified electronic devices includes:

identifying operation information and operation patterns of the identified electronic devices according to each adjacent region;

determining possibilities that operations of the identified electronic devices will be adjusted based on the operation information and the operation patterns of the identified electronic devices; and outputting the operation command corresponding to the gesture to an electronic device having a highest adjustment possibility.

11. The control method of the vehicle according to claim 7, wherein:

the plurality of electronic devices include at least two devices of an air conditioning device, an audio device, a navigation device, a lighting device, a Bluetooth device, a heater within a seat, a window glass opening/closing device, a sunroof opening/closing device, a door opening/closing device, and a door lock device, and the operation command includes a power ON/OFF command and a function adjustment command.

12. The control method of the vehicle according to claim 7, further comprising:

identifying, when the gesture is recognized in one region, an electronic device corresponding to the gesture among electronic devices installed in the one region; and outputting the operation command corresponding to the gesture to the identified electronic device.

13. A human machine interface (HMI) apparatus comprising:

a storage unit configured to store position information of a plurality of regions, information of a plurality of electronic devices arranged in the plurality of regions, and gesture information of a user corresponding to operation commands of the plurality of electronic devices;

a recognition unit configured to recognize a gesture of the user;

a control unit configured to identify electronic devices corresponding to a gesture according to each recognized detection region when the number of recognized detection regions is at least two, determine adjustment possibilities of the electronic devices based on current operation information of the identified electronic devices, determine adjustment possibilities of the identified electronic devices based on at least one of operation information of the identified electronic devices, pre-stored operation patterns of the identified electronic devices, and environmental information, and output an operation command corresponding to the gesture to an electronic device having a highest adjustment possibility among the determined adjustment possibilities; and an output unit connected to each of the plurality of electronic devices and configured to output the operation command to at least one electronic device, wherein when an operation of the identified electronic devices is controlled by the operation command corresponding to the recognized gesture, the control unit is further configured to determine whether the operation of any of the identified electronic devices deviates from the pre-stored operation patterns and determine an electronic device which operates within the pre-stored operation patterns as the electronic device having the highest adjustment possibility, and the control unit is further configured to identify the electronic devices corresponding to the gesture according to each adjacent region, identify values of functions corresponding to the respective operation patterns of the identified electronic devices, compare the identified values of functions corresponding to the respective operation patterns of the identified electronic devices with values of functions corresponding to respective current operation information of the identified electronic devices, and based on the comparison, determine an electronic device with the largest difference as the electronic device having the highest adjustment possibility.

14. The HMI apparatus according to claim 13, wherein, when the number of recognized detection regions is one, the control unit identifies an electronic device having the recognized gesture among electronic devices installed in the detection region and outputs the operation command corresponding to the gesture to the identified electronic device.

15. The HMI apparatus according to claim 13, further comprising a detection unit configured to detect an object for recognizing the gesture of the user, wherein the recognition unit receives a detection signal from the detection unit configured to detect the object for recognizing the gesture of the user.

* * * * *